United States Patent [19]

Takamatsu et al.

[11] Patent Number: 5,119,488

[45] Date of Patent: Jun. 2, 1992

[54] INPUT/OUTPUT SYSTEM IMPLEMENTING SEVERAL ACCESS PATHS FOR REROUTING DATA IN THE EVENT ONE PATH FAILS

[75] Inventors: Hisashi Takamatsu; Hisaharu Takeuchi; Akira Kurano, all of Odawara, Japan

[73] Assignee: Hitachi, Ltd., Tokyo, Japan

[21] Appl. No.: 314,245

[22] Filed: Feb. 21, 1989

Related U.S. Application Data

[63] Continuation of Ser. No. 766,442, Aug. 19, 1985, abandoned.

[30] Foreign Application Priority Data

Sep. 29, 1984 [JP] Japan ................... 59-205317

[51] Int. Cl.⁵ .................... G06F 11/00; G06F 11/34
[52] U.S. Cl. ................... 395/575; 364/228;
364/228.1; 364/228.3; 364/238.2; 364/238.3;
364/241.9; 364/260; 364/262; 364/262.2;
364/264; 364/265; 364/265.1; 364/265.5;
364/266; 364/266.4; 364/266.5; 364/267;
364/267.3; 364/268; 364/268.1; 364/268.3;
364/268.6; 364/268.7; 364/268.9; 371/8.2
[58] Field of Search ... 364/200 MS File, 900 MF File;
371/5.1, 7, 8.1, 8.2, 11.1, 11.2

[56] References Cited

U.S. PATENT DOCUMENTS

| | | | |
|---|---|---|---|
| 3,564,502 | 2/1971 | Boehner et al. | 364/200 |
| 3,688,274 | 8/1972 | Cormier et al. | 364/200 |
| 4,207,609 | 6/1980 | Luiz et al. | 364/200 |
| 4,396,984 | 8/1983 | Videcki, II | 364/200 |
| 4,455,605 | 7/1984 | Cormier et al. | 364/200 |
| 4,471,457 | 9/1984 | Videcki, II | 364/900 |
| 4,490,785 | 12/1984 | Strecker et al. | 364/200 |
| 4,533,996 | 8/1985 | Hartung et al. | 364/200 |
| 4,633,467 | 12/1986 | Abel et al. | 371/16 |
| 4,697,232 | 9/1987 | Brunelle et al. | 364/200 |
| 4,706,190 | 11/1987 | Bomba et al. | 364/200 |

FOREIGN PATENT DOCUMENTS 58-41407 5/1983 Japan.
59-3607 4/1984 Japan.

OTHER PUBLICATIONS

Frush, D. I., *Graceful Degradation in a Multiple Data Path Environment*, IBM TDB, vol. 16, No. 3, Aug. 1973.

Primary Examiner—Thomas C. Lee
Assistant Examiner—Robert B. Harrell
Attorney, Agent, or Firm—Antonelli, Terry, Stout & Kraus

[57] ABSTRACT

An interrupt control system having a plurality of access paths includes a control memory for storing control information for controlling all of the access paths. When an error occurs on a path, a control unit controlling the respective access paths refers to and updates the control memory to execute a channel reconnection without using the path on which the error has occurred, and then executes a retry command to carry out an error recovery operation.

16 Claims, 5 Drawing Sheets

FIG. 2B
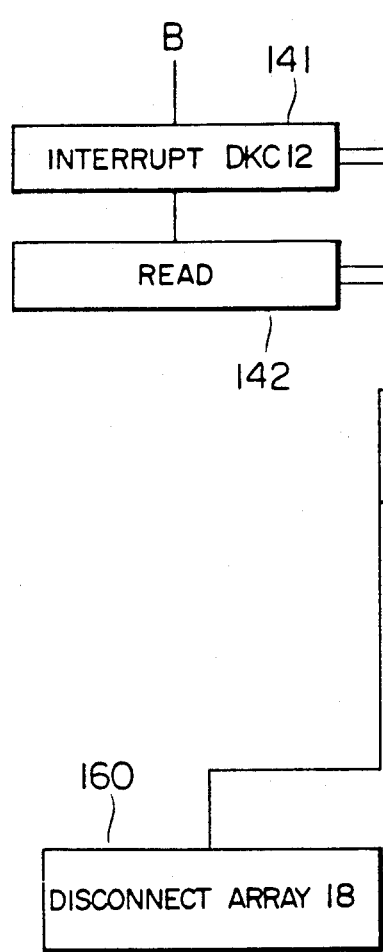
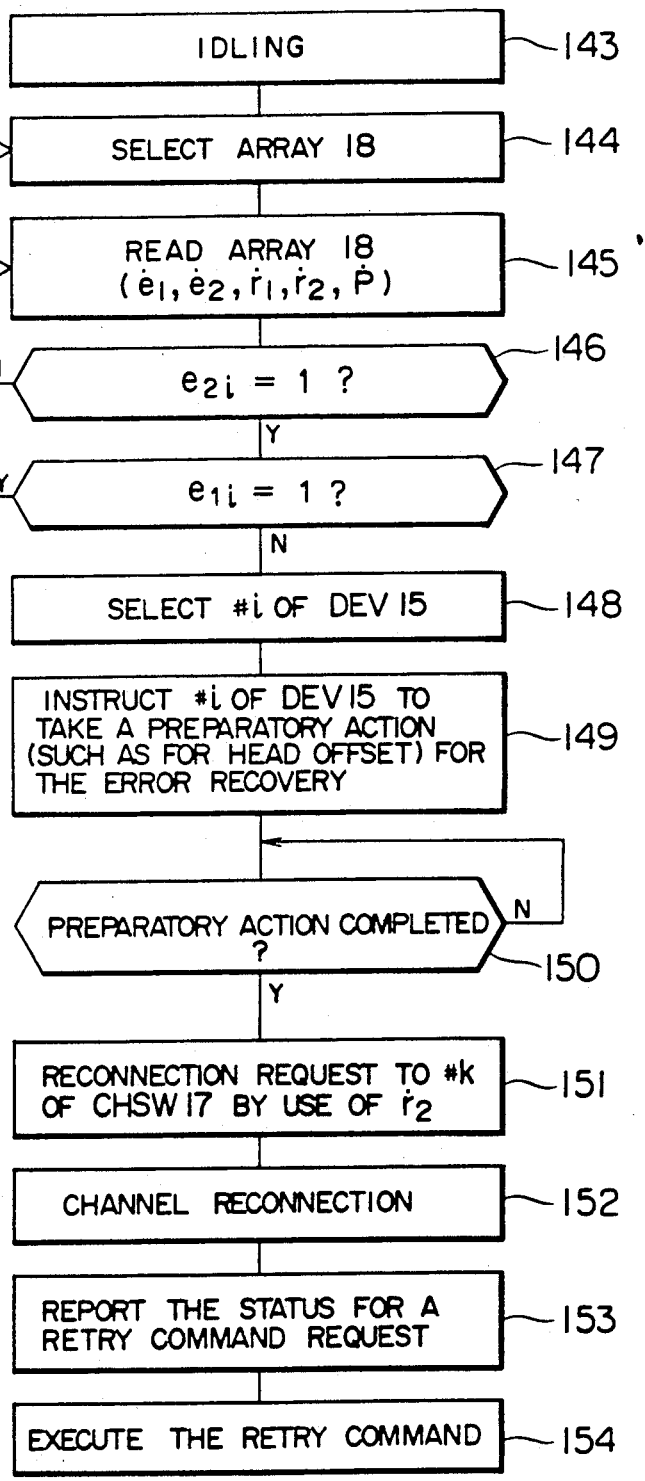

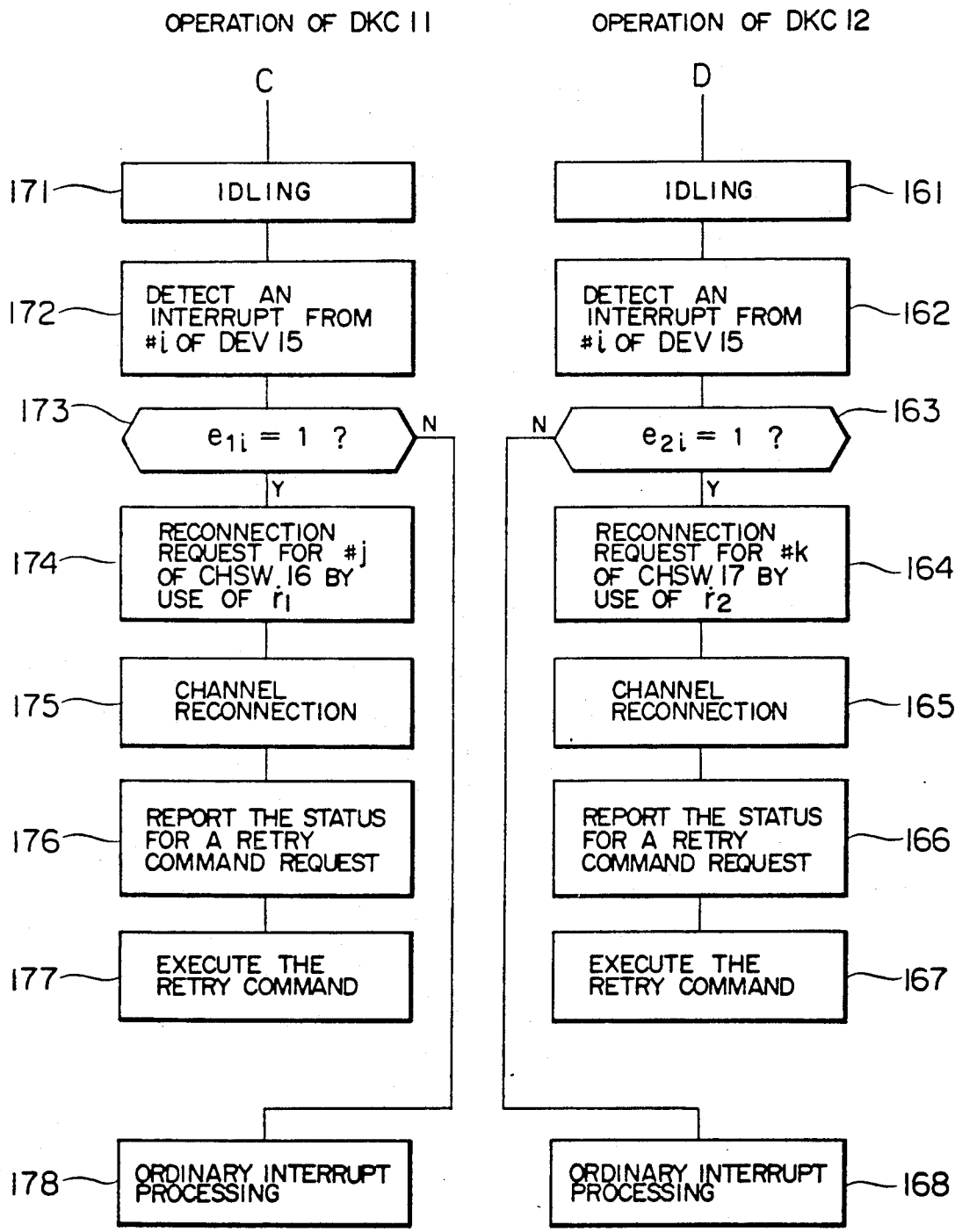

INPUT/OUTPUT SYSTEM IMPLEMENTING SEVERAL ACCESS PATHS FOR REROUTING DATA IN THE EVENT ONE PATH FAILS

This application is a continuation of application Ser. No. 766,942, filed Aug. 19, 1985, now abandoned.

BACKGROUND OF THE INVENTION

1. FIELD OF THE INVENTION

The present invention relates to an interrupt control system, and in particular, to an interrupt control system applicable to an error recovery to be conducted in an input/output system having a plurality of access paths.

2. DESCRIPTION OF THE PRIOR ART

Conventionally, in a system in which a plurality of central processing units, CPU's access a plurality of shared units such as input/output units or external storage devices, a shared unit to be accessed by a CPU is connected via a dedicated path to the CPU. If the same CPU desires to access the same shared unit via another path so as to establish a connection therebetween, a Start I/O instruction must be executed. For the execution of the Start I/O instruction, a considerable processing time is required for each instruction. To overcome this difficulty, there has been proposed a system in which a map reflecting the network state is generated and stored in a control unit, and when executing a series of instructions, the control unit disconnects a shared unit from a channel and thereafter connects the disconnected unit to another channel based on the information contained in the map (Japanese Patent Examined Publication No. 58-38818).

FIG. 4 is a schematic diagram illustrating the configuration of an input/output system utilizing the interrupt control method of above-mentioned system.

The system of FIG. 4 comprises disk control units 11-12, channel switches 16-17, string controllers 13-14, a control memory 18, and disk drive units 15 (shared devices #1-#N).

The disk control units 11-12 are each connected to a plurality of channels via the channel switches 16 and 17, respectively, and are also connected to the string controllers 13 and 14, respectively. The string controllers are connected to a plurality of disk drive units 15. The control memory 18 is shared between the string controllers 13 and 14.

In this case, when path #j (j = 1, 2, ..., m) of the channel switch 16 and path #k (k = 1, 2, ..., n) of the channel switch 17 are connected to the same CPU, if the state of the channel selection is notified to the disk control units 11 and 12 by use of specific commands, the path #j of the channel switch 16 and the #k of the path channel switch 17 form a path group. The information that the path #j and #k are of the same path group is recorded in the control memory 18 by the disk control unit 11 or 12. In the operation after this point, the disk control units 11-12 check the control memory 18 to confirm the information of the path group.

In FIG. 4, a command chain issued to the device #i (i = 1, 2, ..., N) of the disk drive unit 15 via the path #j of the channel switch 16 is processed as follows.

(i) First, the disk control unit 11 receives a Seek and Set Sector command via the path #j of the channel switch 16 and directs the instruction of the command to the disk drive unit 15 through the string controller 13.

(ii) The disk control unit 11 records in the control memory 18 the information that the Seek and Set Sector instruction has been issued to the device #i of the disk drive unit 15 through the path group including the path #j of the channel switch 16 and the path #k of the channel switch 17.

(iii) The disk control unit 11 disconnects the linkage between the channel and the string controller 13. In this operation, the linkage to the channel is disconnected by reporting a status code including only "the channel end" information to the channel. The disconnection is recorded in the control memory 18.

(iv) The string controller 14 reports the change in the contents of the control memory 18 to the disk control unit 12.

(v) The disk control unit 12 reads the control memory 18 and recognizes that the Seek and Set Sector command has been specified to the device #i of the disk drive unit 15 through the path group comprising the path #j of the channel switch 16 and the path #k of the channel switch 17.

(vi) On the other hand, when the device #i of the disk drive unit 15 completes the Seek and Set Sector commands initiated according to the operation of step (i) described above, it causes an interrupt to be sent to the string controllers 13-14 to indicate the completion.

(vii) The string controllers 13-14 cause an interrupt to the disk control units 11 and 12, respectively, to report the completion of the operation.

(viii) To report the completion of the path #j of the channel switch 16 or to the path #k of the channel switch 17, the disk control unit 11 issues a request for the reconnection to the channel via the path #j of the channel switch 16.

(ix) Since the disk control unit 12 must also indicate the completion to the path #j of the channel switch 16 or the path #k of the channel switch 17, it issues a request for the reconnection to the channel via the path #k of the channel switch 17.

In this case, the path #j of the channel switch 16 or the path #k of the channel switch 17 is reconnected. If the path #k of the channel switch 17 is reconnected, a path is established from the path #k of the channel switch 17 via the disk control unit 12 and the string controller 14 to the device #i of the disk drive unit. Since the Seek and Set Sector operation has been completed on the device #i of the disk drive unit 15, the completion is reported through the path #k of the channel switch 17.

(xi) Data transfer from the channel to the device #i of the disk drive unit 15 is carried out via the path established in step (x) described above.

In the conventional method, the reconnection has been conducted only by use of the channel switch actuated (the path #j of the channel switch 16 in the system of FIG. 4); however, the control method described above enables the reconnection to be performed via a channel switch belonging to a path group initiated (the path #j of the channel switch 16 or the #k of the channel switch 17 of FIG. 4). In the control method of FIG. 4, therefore, the possibility of successful connections is increased, thereby greatly reducing the number of unsuccessful Set Sector operations which have long remained unsolved. In general, since the linkage to a channel is disconnected by reporting a status only containing "the channel end" only when a simple multioperation is carried out, the function for establishing a reconnection path by use of an arbitrary channel switch in the path group brings forth an advantageous effect.

In the control method, however, a path for which a linkage in the path group has been disconnected may be used again to establish the reconnection path. For example, if an error which has occurred on an activated path is to be recovered by a command retry, the reconnection should not be carried out by use of the activated path. The Japanese Patent Examined Publication No. 58-38818 has not disclosed any ideas applicable to such a case, and hence the error cannot be recovered.

SUMMARY OF THE INVENTION

It is therefore an object of the present invention to provide an interrupt control system which solves the above-mentioned problem and executes the reconnection request for a channel without using the path on which an error has occurred, thereby improving the probability of a successful error recovery.

To achieve the stated object, there is provided an interrupt control system in an input/output system having a plurality of access paths in accordance with the present invention wherein said interrupt control system comprises a control memory for storing control information for controlling all of said plurality of access paths and a control unit for controlling each path refers to and updates the control memory, when an error occurs on a path, to perform a reconnection of a channel without using the path on which the error has occurred, and then executes a retry command to achieve an error recovery.

BRIEF DESCRIPTION OF THE DRAWINGS

FIGS. 2A and 2B are flowcharts of operations of the present invention by respective disc control units involving disconnection and reconnection of the channel and the reporting of the status of a command retry request following the operations illustrated in FIG. 1;

FIG. 3 is a flowchart of operations of the present invention by the respective disc control units following the operations illustrated in FIGS. 2A and 2B.

DESCRIPTION OF THE PREFERRED EMBODIMENTS

Referring to the accompanying drawings, embodiments of the present invention will be described in detail.

Figure 4:
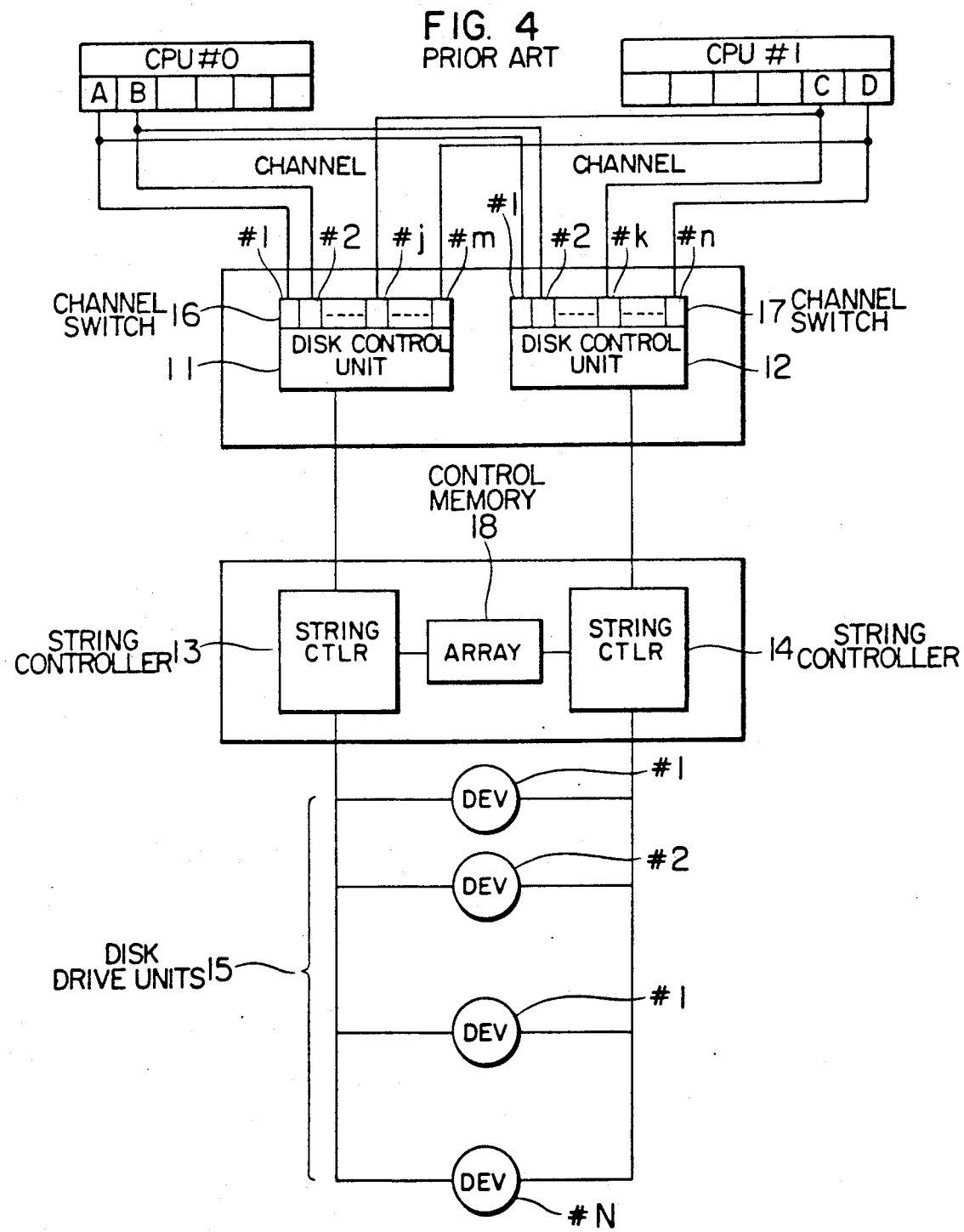
FIG. 4 is a schematic configuration diagram of an external storage subsystem having a plurality of access paths.

In a system in which at least two paths exist between a CPU and a disk drive, unit 15, as shown in FIG. 4, if an error occurs in a device such as a disk control unit, a string controller, or the like connected to a path being used, the error can be recovered by executing an error recovery operation through another path. In accordance with the present invention, the changeover of the path is carried out by a command retry, not by use of the operating system (OS). This can be accomplished in the system of FIG. 4 simply by modifying the control programs in the disk control units 11-12 without necessitating any hardware changes.

As an example, let us assume that during execution of a command chain issued to the device #i (i = 1, 2, ..., N) of the disk drive unit 15 via the path #j (j = 1, 2, ..., m) of the channel switch 16 of FIG. 4, an error occurs in the disk control unit 11, the controller 13, or the device #i of the disc drive unit 15.

In this case, a command retry is performed to execute the command again for the error recovery in general. The following paragraphs describe the interrupt control system for the command retry to be executed to recover the error in accordance with the present invention.

First, the command retry (for the disk control unit) is defined by use of vectors as follows.

$$\vec{e}_1 = (e_{11}, e_{12}, \ldots, e_{1N}) \\ \vec{e}_2 = (e_{21}, e_{22}, \ldots, e_{2N}) \quad (1)$$

Where, the value of $e_{1i}$ (i = 1, 2, ..., N) is "1" if the command retry for the device #1 of the disk drive unit 15 is to be conducted through the disk control unit 11; otherwise, it is "0". Similarly, the value of $e_{2i}$ is "1" if the command retry is to be performed via the disk control unit 12; otherwise, it is "0".

As a consequence, there exist three types of command retries as follows.
(i) For $e_{1i} = e_{2i} = 1$, either one of disk control units 11 and 12 may be used.
(ii) For $e_{1i} = 1$ and $e_{2i} = 0$, the command retry can be carried out only through the disk control unit 11.
(iii) For $e_{1i} = 0$ and $e_{2i} = 1$, only the disk control unit 12 can be used.

Next, the command retry (for the channel switch) is defined in terms of vectors as follows.

$$\vec{r}_1 = (r_{11}, r_{12}, \ldots, r_{1m}) \\ \vec{r}_2 = (r_{21}, r_{22}, \ldots, r_{2n}) \quad (2)$$

Where, the value of $r_{1j}$ (j = 1, 2, ..., m) is "1" if the channel reconnection is carried out by use of a command retry via the path #j of the channel switch 16; otherwise, it is "0". In a similar fashion, the value of $r_{2k}$ (k = 1, 2, ..., n) is "1" if the channel reconnection is to be executed through the path #k of the channel switch 17; otherwise, it is "0".

Consequently, the elements of which the values are "1" in the vectors $\vec{r}_1$ and $\vec{r}_2$ represent channel switches 16 and 17 belonging to the same path group as that of the channel switch 16 or 17 which has activated the operation for the device #i of the disk drive unit 15.

Next, the interrupt report (interrupt from the string controller to the disk control unit) is defined by use of the concept of a vector as follows.

$$\vec{P} = (P_1, P_2) \quad (3)$$

Where, the value of $P_1$ is "1" if the string controller 13 must issue an interrupt report when the disk control unit 11 sends a polling sequence to the string controller 13; otherwise, it is "0". Similarly, the value of $P_2$ is "1" if the string controller 14 must issue an interrupt report when the disk control unit 12 sends a polling sequence to the string controller 14; otherwise, it is "0". The disk control unit 11 sets $P_2$ to "1" to cause the string controller 14 to interrupt the disk control unit 12, thereby indicating to the disk control unit 12 that the contents of the control memory have been changed. Similarly, the indicating notification from the disk control unit 12 to the disk control unit 11 is effected when the disk control unit 12 sets $P_1$ to "1". These vectors $\dot{e}_1$, $\dot{e}_2$, $\dot{r}_1$, $\dot{r}_2$, and $\dot{P}$ are written into or read from the control memory 18 by the disk control units 11 and 12.

FIGS. 1, 2A-2B and 3 are operation flowcharts illustrating an embodiment of the present invention.

In FIGS. 1, 2A-2B and 3, there are shown operations of the disk control units, DKC's 11-12 and the control memory (ARRAY) 18. It has been assumed as an example that the path #j of the channel switch 16 and the path #k of the channel switch 17 belong to the same path group and that an error occurs after the path #j of the channel switch 16 activates the device #i of the disk drive unit 15.

Figure 1:
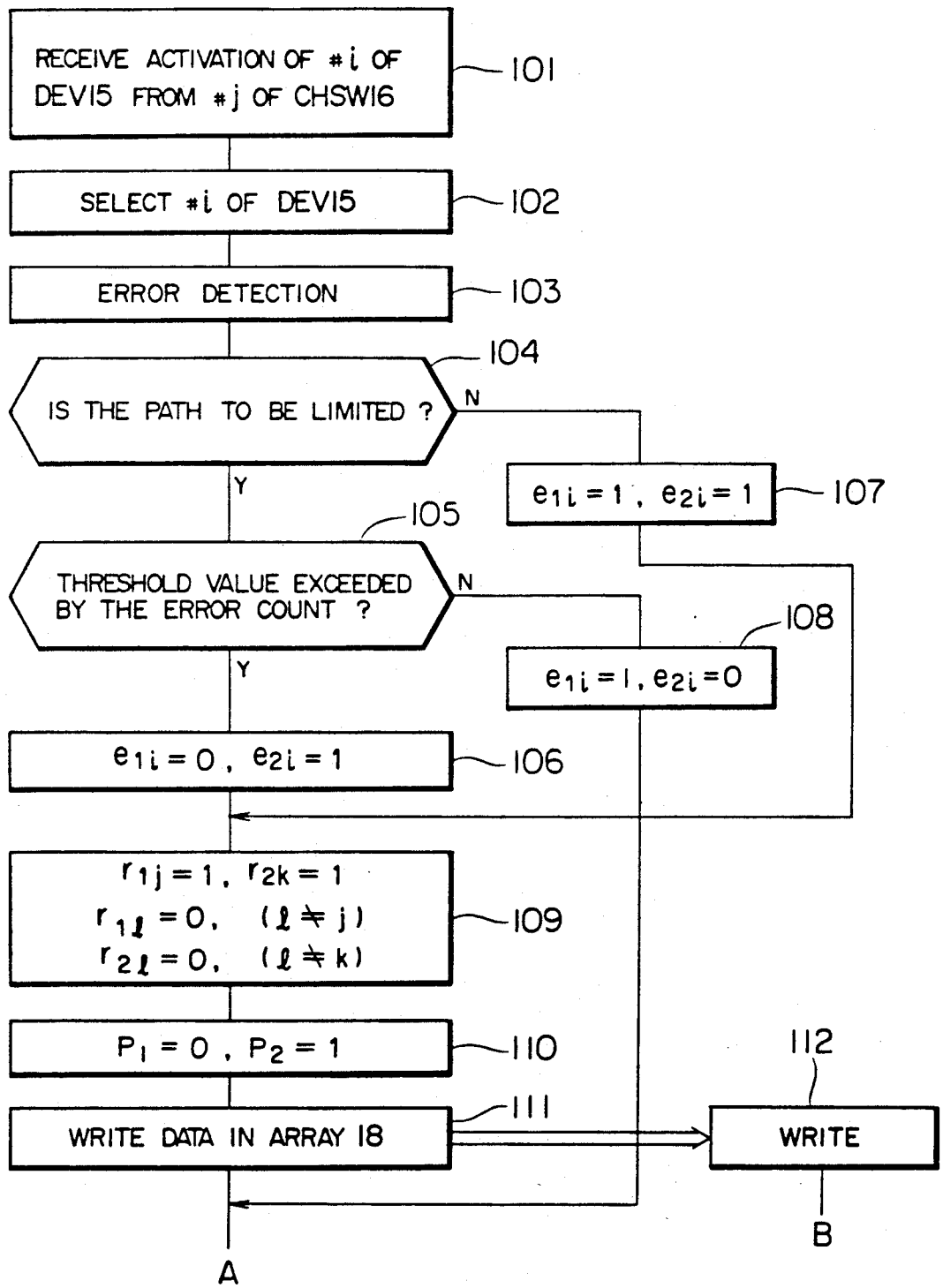
FIG. 1 is a flowchart of operations of the present invention involving detection of an error in subsystem operation and the instruction of a retry.

In FIG. 1, when the disk control unit 11 receives an initiation of the device #i of the disk drive unit 15 issued from the path #j of the channel switch 16 (step 101), it selects the device #i of the disk drive unit 15, then the selected device #i is connected via the path #j of the channel switch 16, the disk control unit 11, and the string controller 13 (step 102). Here, an error is detected in the disk control unit 11, the controller 13, or the disk drive unit 15 (step 103). Next, it is determined whether or not the path is limited for the retry (step 104). If the path is to be limited, it is determined whether or not the threshold value is exceeded by the number of occurrences of the error (step 105). If a retry is to be conducted without limiting the path, the vectors $e_{1i}$ and $e_{2i}$ are each set to "1" to allow the reconnection to be established through either one of the disk control units 11-12 (step 107), and the vectors $r_{1j}$ and $r_{2k}$ are each set to "1" to specify that the path #j of the channel switch 16 and the path #k of the channel switch 17 belong to the same path group (step 109).

Next, the vector $P_2$ is set to "1" to indicated the condition to the other disk control unit 12 (step 110). Then, data is written in the control memory 18 (steps 111-112).

On the other hand, if the error count does not exceed the threshold value, the vectors $e_{1i}$ and $e_{2i}$ are set to "1" and "0", respectively, to allow the reconnection to be established only through the disk control unit 11, so that the retry is carried out by use of the same path (step 108). If the threshold value is exceeded by the error count, the vectors $e_{1i}$ and $e_{2i}$ are set to "0" and "1", respectively to limit the path so as to allow the reconnection to be achieved only via the disk control unit 12 (step 106). When the path is limited, steps 109-112 are also processed as indicated above.

Figure 2A:
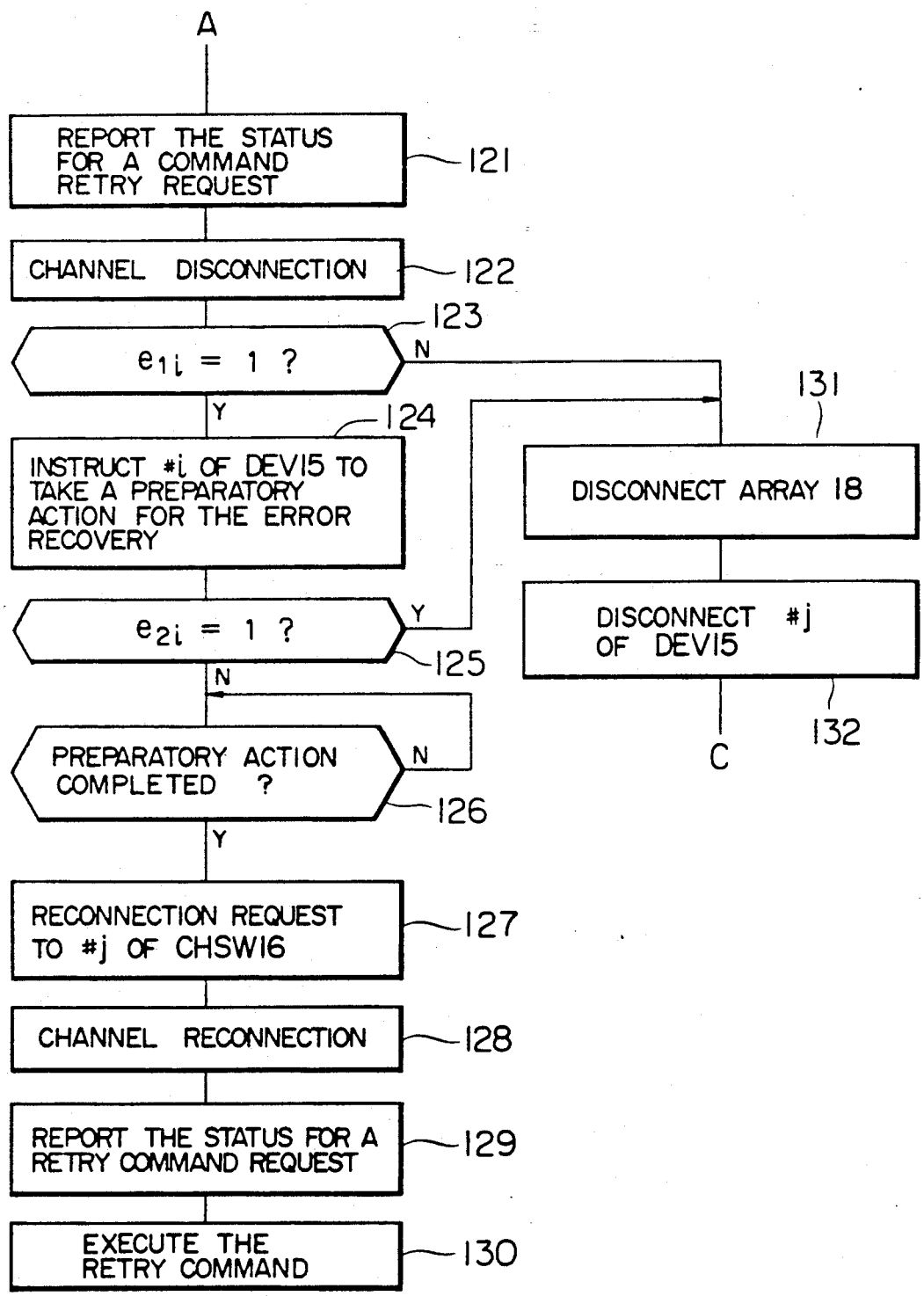

In FIG. 2A, the disk control unit 11 reports to the channel the status for a command retry request to disconnect the channel (steps 121-122), then determines whether or not the vector $e_{1i}$ has been set to "1". If this is not the case, the reconnection is not executed via the disk control unit 11, and hence the control memory 18 is disconnected from the device #i of the disk drive unit 15 (steps 123, 131, and 132). If $e_{1i}$ has been set to "1", the device #i of the disk drive unit 15 is instructed to take a preparatory action for the error recovery (steps 123-124). Next, it is checked whether or not the vector $e_{2i}$ has been set to "1". If this is the case, the control memory 18 is separated from the device #i of the disk drive unit 15 (steps 125, 131, and 132). On the otherhand, if $e_{1i}$ and $e_{2i}$ are set to "1" and "0", respectively, a reconnection request is issued to the path #j of the channel switch 16 after the preparatory action is finished, then the channel reconnection is achieved (steps 125-128). When the channel reconnection is completed, the status for a retry command request is reported to execute the retry command (steps 129-130).

On the other hand, the disk control unit 12 operates as follows with reference to FIG. 2B. The control unit 12 in the idling state receives an interrupt from the control memory 18, selects this memory 18, and reads the vectors $\dot{e}_1$, $\dot{e}_2$, $\dot{r}_1$, $\dot{r}_2$, and $\dot{P}$ (steps 141-145). Among the vectors read, if $e_{2i} = $ "0" or/and $e_{1i} = $ "1" has/have been set, the control memory 18 is disconnected (steps 146, 147, and 160). On the other hand, if $e_{2i} = $ "1" and $e_{1i} = $ "0" have been set, the device #i of the disk drive unit 15 is selected and is instructed to take a preparatory action for the error recovery (steps 146-149). When the preparatory action is finished, the disk control unit 12 issues a reconnection request for the path #k of the channel switch 17 by use of $\dot{r}_2$ (steps 150-151). When the channel is reconnected, the status for a retry command request is reported to execute the retry command (steps 152-154).

FIG. 3 is a flowchart illustrating the operation to be conducted after the control memory 18 is disconnected from the disk drive unit 15 (#i) as shown in FIGS. 2A and 2B.

First, the disk control unit 11 is in the state of $e_{1i} = $ "0" or $e_{2i} = $ "1", and hence the control memory 18 is disconnected from the device #i of the disk drive unit 15, then the idling state is established (step 171). When the device #i of the disk drive unit 15 issues an interrupt request, the disk control unit 11 detects the interrupt request and checks whether or not $e_{1i}$ has been set to "1". If this is not the case, the reconnection must be performed only through the disk control unit 12, and hence the ordinary interrupt processing is executed (steps 172, 173, and 178). If $e_{1i}$ is "1" when the interrupt is detected, the retry can be achieved by use of the disk control unit 11, so a reconnection request for the path #j of the channel switch 16 is issued by use of $\dot{r}_1$. After the channel is reconnected, the status for a retry command request is reported (steps 172-176), thereby executing the retry command (step 178).

Next, an entirely identical operation (steps 161-168) is carried out in the disk control unit 12 so as to execute the retry command.

As described above, when an error occurs in an ordinary case, it cannot be clearly identified whether the error has occurred in the disk control unit 11 or 12, the string controller 13 or 14, or the disk drive unit 15. If the error source is found to be the disk drive unit 15, the probability of successful error recovery cannot be improved even if the path is altered. However, if the error source is the disk control unit 11 or 12 or the string controller 13 or 14, the error can be generally recovered only by a retry if the path is changed. There are two methods for changing the path, namely, the path to be activated by the operating system is changed or the path for the command retry is changed. In the former method, an input/output interrupt to the operating system takes place. This is not the case in the latter method, which is therefore advantageous over the former. In addition, as can be seen from step 105 of FIG. 1, the path adopted for the error recovery can be changed when the number of errors of a specific type becomes equal to or greater than a predetermined value. This provision makes it possible to reduce the number of unnecessary path changes. Moreover, the present invention can be applied to the general input/output systems.

In accordance with the present invention as described above, the error recovery is achieved without using the path on which an error has occurred in an input/output system having a plurality of access paths, thereby increasing the possibility of a successful error recovery. Especially, if an error occurs in a device on a path, not in an input/output unit, the error can be recovered by one retry. Furthermore, since the error recovery is carried out by a command retry, the overhead due to the input/output interrupts is reduced as compared with the recovery by use of the operating system.

We claim:

1. An input/output system having a plurality of access paths provided between at least one input-output device and a plurality of channels to which a central processing unit is connected, comprising:

a control memory connected to receive control information from said central processing unit via said channels for storing said control information, said control information containing information for controlling connection of said plurality of access paths between a respective channel and said input/output device to connect said central processing unit and said input/output device via at least one channel; and control means including first and second controllers each connected to said control memory and said access paths for controlling connection of said access paths between said input/output device and a respective channel according to said control information stored in said control memory and for referring to and updating the control information in said control memory, when an error occurs on one of said access paths between a channel and a specific input/output device, to effect a channel reconnection to said specific input/output device without utilizing said one of said access paths on which an error has occurred, said control means including means for executing a retry command so as to perform an error recovery operation by connecting said specific input/output device via one of said access paths indicated by updated control information from one of said first and second controllers to a channel.

2. A system according to claim 1, wherein said control information stored in said control memory includes first vector data indicating for said specific device whether a command retry is to be conducted through said first controller, said second controller or either of said first and second controllers.

3. A system according to claim 2, wherein said control information stored in said control memory further includes second vector data indicating for each access path whether channel reconnection is to be carried out by use of a command retry.

4. A system according to claim 3, wherein said control means further includes first and second string controllers each connected between a device and a respective one of said first and second controllers, and wherein said control information stored in said control memory further includes third vector data indicating whether said first or second string controller is required to issue an interrupt report in response to receipt of a polling sequence from said first or second controller.

5. In a system having first and second controllers each selectively connected to respective groups of channels, which channels are connected to a plurality of central processing units, a storage unit including a plurality of shared devices, a control memory for storing connection information relating to a connection of a shared device to one or more channels, and first and second string controllers connected to said control memory for selectively connecting said shared devices to said first and second controllers so as to effect connection of said devices to a central processing unit via said channels according to said stored connection information, a method of error handling in said system comprising the steps of:

(a) responding in said first controller to a command received on a first channel to which said first controller is connected by storing in said control memory connection information relating to the connection of a selected shared device to said first channel and to a second channel connected to said second controller, and connecting said first channel to said first string controller to send said command to said first string controller;

(b) operating said first controller to disconnect itself from said first string controller after sending said command thereto;

(c) operating said first string controller to send said command to said selected shared device for execution;

(d) detecting an error in operation of said first controller, said first string controller or said storage unit, and storing in said control memory vector information indicating said second channel for reconnection to effect retry in sending said command to said selected shared device in response to detection of said error; and (e) operating said second controller to read said vector information in said control memory and, in response thereto, to send a retry command request to said second channel.

6. The method according to claim 5, wherein said step (d) comprises:

(d1) repeating the steps of detecting an error in operation of said first controller, said first string controller or said storage unit;

(d2) detecting a number of times of occurrence of said error;

(d3) if a number of times of occurrence of said error is less than a predetermined value, storing in said control memory vector information indicating said first channel for reconnection via said first controller to effect retry by sending said command to said first channel, re-connecting said first controller to said first string controller and controlling said first controller to read said vector information in said control memory and, in response thereto, to send a retry command to said first channel; and (d4) if a number of times of occurrence of said error is more than said predetermined value, storing in said control memory vector information indicating said second channel for reconnection to effect retry by sending said command to said second channel.

7. An access path control system for a data processor comprising:

at least one central processing unit;

a plurality of input/output control devices connected to a plurality of channels of said central processing unit by a plurality of access paths;

at least one input/output device connected to said input/output control devices for sending and receiving data via said plurality of access paths;

error detection means for detecting an error in input/output operation on an access path; and a control memory coupled to a specific input/output control device for storing control data sent from said central processing unit for controlling a selection of access paths between said plurality of channels and said one input/output device and for storing a number of times of occurrence of error for each access path each time occurrence of an error therein is detected;

said input/output control devices including determination means responsive to receipt of a start command for said one input/output device from said control processing unit for determining an access path to be used, according to contents of said control memory, and for selecting an access path other than an access path for which a number of error occurrences exceeds a predetermined threshold value to connect one of said one plurality of channels and said input/output device via an access path.

8. A system according to claim 7, further comprising means, responsive to detection by said specific input/output control device of a failure in connection between a channel and a specific input/output device through an access path selected by said determination means in said specific input/output device, for reconnecting said channel and said specific input/output device until the number of error occurrences exceeds said threshold value.

9. A system according to claim 7, said specific input/output control device further including means for reconnecting a channel and a specific input/output device upon occurrence of a failure of connection therebetween as to a certain access path and executing a retry command through another access path for error recovery.

10. A system according to claim 7, wherein each of said determination means includes means for accessing said control data in the control memory to determine a selected access path and for then executing said start command, and means for accessing said number of times of occurrence of error stored in the control memory in response to a failure of execution of the start command through said selected access path and for determining an access path other than the failed access path to reconnect a channel and a specific input/output device for error recovery.

11. An access path control system in a data processing system including at least specific central processing unit, a plurality of channels connected to said at least one central processing unit, a plurality of input/output control units connected to said plurality of channels and at least one input/output device connected to said input/output control units, and a plurality of access paths being established to transfer data between said plurality of channels and input/output devices through said plurality of input/output control units, comprising:

a control memory connected to said central processing unit and said plurality of input/output control units for storing information regarding access paths available between said plurality of channels and said specific input/output device from the central processing unit and a number of times of error occurrence as detected by an error detector for each access path; and wherein, when said error detector detects that an error occurs in one of said access paths through which one of said plurality of channels and said specific input/output device have been connected, a specific input/output control unit associated with a specific channel refers to said control memory, detects access paths available by said specific input/output device, checks a number of times of error occurrence in said available access paths, selects one of the access paths available other than access paths in which the number of times of error occurrence exceeds a predetermined value and reconnects said channel and said specific input/output device.

12. An access path control system in a data processing system, including at least one central processing unit, a plurality of channels connected to said at least one central processing unit, a plurality of input/output control units connected to said plurality of channels and at least one input/output device connected to said input/output control units, and a plurality of access paths being established to transfer a data between said plurality of channels and said one input/output device through said plurality of input/output control units, comprising:

a control memory connected to said central processing unit and said plurality of input/output control units for storing information regarding access paths available between said plurality of channels and said one input/output device and a number of times of error occurrence for each access path;

wherein said central processing unit issues a reconnection request for reconnection to one of said plurality of channels from said one input/output device to one of said plurality of input/output control units associated with a specific channel; and in response to said reconnection request, said one of said input/output control units associated with said specific channel refers to said control memory, detects access paths available by said input/output device, checks the number of times of error occurrence in said available access paths, selects one of the access paths available other than access paths in which a number of times of error occurrence exceeds a predetermined value and reconnects said channel and said input/output device.

13. An interrupt control method in an input/output system having a plurality of access paths provided between at least one input/output device and a plurality of channels to which at least one of central processing unit is connected, the method comprising the steps of:

(a) storing in a control memory a control information received from said central processing unit via said channels;

(b) controlling said plurality of access paths to connect the central processing unit and a specific device via at least one channel using said stored control information;

(c) controlling said access paths in response to said control information stored in said control memory;

(d) referring to and updating the control information in said control memory, when an error occurs on one of said access paths between a specific channel and a specific device, to effect a channel reconnection without utilizing said one access path on which an error has occurred; and (e) executing a retry command so as to perform an error recovery operation with respect to said specific device via an access path indicated by said updated control information.

14. An access path control method for a data processor having a plurality central processing unit, a plurality input/output control devices connected to a plurality of channels of said central processing unit by a plurality of access paths, and at least one input/output device connected to said input/output control devices for sending and receiving data via said plurality of access paths, the method comprising the steps of:
- storing in a control memory control data sent from said central processing unit for controlling a selection of access paths between said plurality of channels and said at least one input/output device and storing a number of times of occurrence of error for each access path each time occurrence of an error therein is detected;
- determining, in response to receipt of a start command for said at least one input/output device from said central processing unit, an access path to be used, according to contents of said control memory; and
- selecting an access path other than an access path for which a number of error occurrences exceeds a predetermined threshold value to connect one of said plurality of channels and said input/output device via an access path.

15. An access path control method in a data processing system, including at least one central processing unit, a plurality of channels connected to said one central processing unit, a plurality of input/output control units connected to said plurality of channels and at least one input/output device connected to said input/output control units, and a plurality of access paths being established to transfer data between said plurality of channels and said one input/output device through said plurality of input/output control units, comprising the steps of:
- storing in a control memory information regarding access paths available between said plurality of channels and said one input/output device and a number of times of error occurrence for each access path; and
- when an error occurs in one of said access paths through which one of said plurality of channels and said one input/output unit have been connected, causing an input/output control device associated with said one of said plurality of channels to refer to said control memory, to detect access paths available by said one input/output device, to check the number of times of error occurrence in said available access paths, to select one among access paths available other than access paths in which a number of times of error occurrence exceeds a predetermined value and to reconnect said one of said plurality of channels and said one input/output device.

16. An access path control method in a data processing system, including at least one central processing unit, a plurality of channels connected to said at least one central processing unit, a plurality of input/output control units connected to said plurality of channels and at least one input/output device connected to said input/output control units, and a plurality of access paths being established to transfer data between said plurality of channels and said one input/output device through said plurality of input/output control units, comprising the steps of:
- storing in a control memory information regarding access paths available between said plurality of channels and said one input/output device and a number of times of error occurrence for each access path;
- issuing a reconnection request for reconnection to one of said plurality of channels from said one input/output device to one of said plurality of input/output control units associated with a specific channel; and
- causing said one input/output control device associated with said specific channel to refer to said control memory in response to an issued reconnection request, to detect access paths available by said one input/output device, to check a number of times of error occurrence in said available access paths, to select one among access paths available other than access paths in which a number of times of error occurrence exceeds a predetermined value and to reconnect said specific channel and said one input/output device.

* * * * *

UNITED STATES PATENT AND TRADEMARK OFFICE
CERTIFICATE OF CORRECTION

PATENT NO. : 5,119,488
DATED : June 2, 1992
INVENTOR(S) : Hisashi Takamatsu, Hisaharu Takeuchi and Akira Kurano It is certified that error appears in the above-identified patent and that said Letters Patent is hereby corrected as shown below:

In column 9, line 14, in claim 7, delete "control" and insert -- central --.

In column 9, line 49, in claim 11, insert -- one-- after "at least".

Signed and Sealed this

Ninth Day of November, 1993

Attest:

BRUCE LEHMAN

Attesting Officer    Commissioner of Patents and Trademarks